W. H. NUDD.
MACHINE FOR MAKING WOODEN EAVES-TROUGH.
No. 186,944. Patented Feb. 6, 1877.
Fig. I.
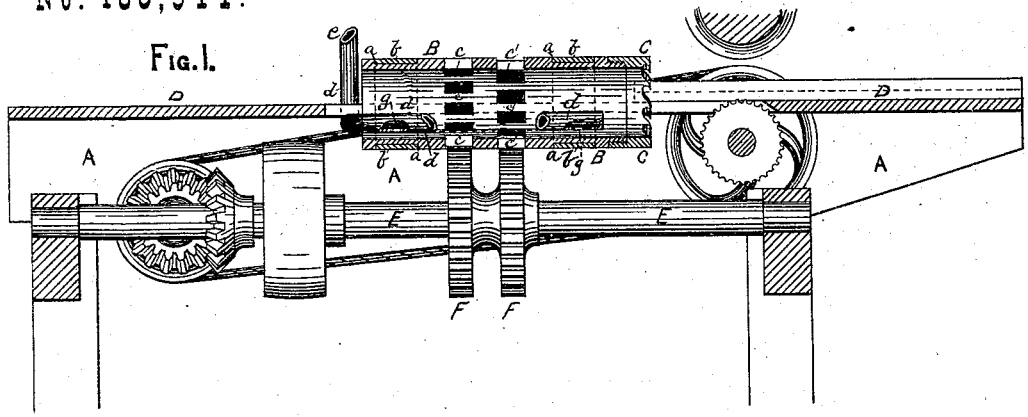
Fig. II.
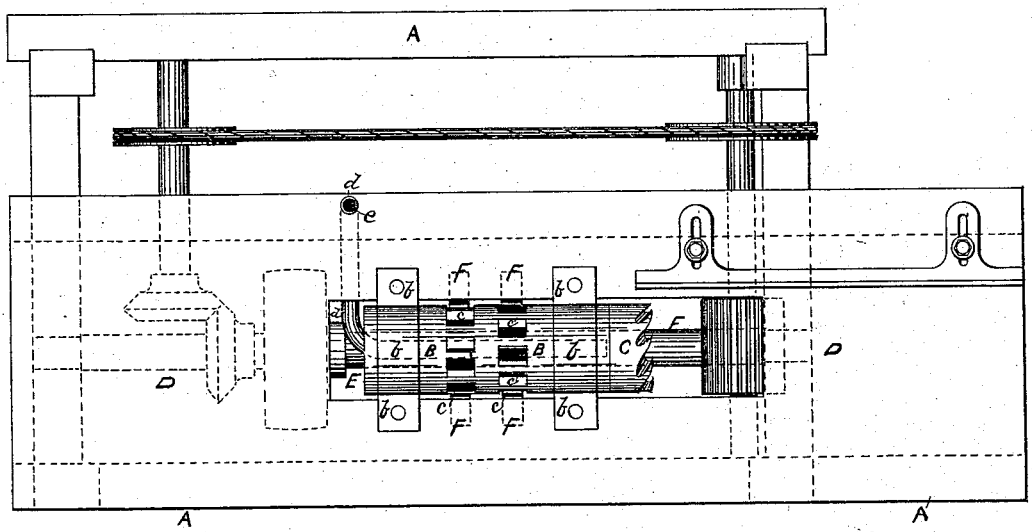
Fig. V. Fig. III. Fig. IV.
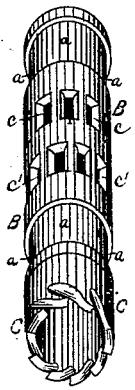 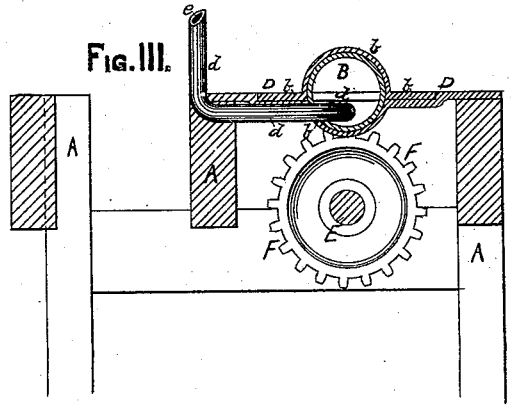 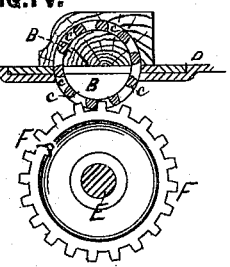
C. H. Woodward
John T. Halsted
WITNESSES.
William Henry Nudd,
INVENTOR, BY
Louis Feeser & Leo, Attys.

UNITED STATES PATENT OFFICE.

WILLIAM H. NUDD, OF MINNEAPOLIS, MINNESOTA.

IMPROVEMENT IN MACHINES FOR MAKING WOODEN EAVES-TROUGHS.

Specification forming part of Letters Patent No. 186,944, dated February 6, 1877; application filed November 17, 1876.

*To all whom it may concern:*

Be it known that I, WILLIAM HENRY NUDD, of Minneapolis, in the county of Hennepin and State of Minnesota, have invented certain new and useful Improvements in Machines for Making Wooden Eaves-Troughs, &c., of which the following is a specification:

This invention relates to machines for making wooden eaves-troughs or gutters for the roofs of houses, &c.; and consists in the manner of mounting and operating the hollow cylindrical saw and mandrel, by which the gutters are formed, as hereinafter described.

In the drawings, Figure 1 is a sectional side elevation. Fig. 2 is a plan view. Fig. 3 is a cross-section through the line $x\ x$. Fig. 4 is a detached view of the hollow mandrel through one of the series of gear-teeth. Fig. 5 is a perspective view of the hollow mandrel and saw detached from its bearings.

A is the frame; B, the hollow cylindrical mandrel or arbor; and C, the hollow cylindrical saw, screwed or otherwise secured to the mandrel in the usual manner. This hollow mandrel has two depressions, $a\ a'$, (see Fig. 5,) in which the two portions of the boxes or bearings $b\ b'$ fit. These boxes secure the mandrel in place on the frame A, and will be made thin and wide, so as not to project beyond the surface of the mandrel, while the extra width secures the requisite strength. They will be so arranged as to leave one-half or more of the mandrel above the top of the table D. By this means the exterior of the upper half of the mandrel will be left entirely smooth, and will offer no resistance to the passage of the lumber over its surface. $c\ c'$ are a series of gear-teeth, formed in the shell of the hollow mandrel B, between the bearings $b\ b'$, which act in conjunction with gear-wheels D D' on a shaft, E, beneath the mandrel to operate the same. Two rows or sets of the teeth $c\ c'$ are shown, arranged in alternate positions, the spaces of one set coming opposite to the teeth of the other set, the two wheels D D' occupying the same relative position.

The object of this arrangement is to prevent "backlash," as one set of teeth and one wheel will take up the backlash or slip of the other, and thus prevent rattling and loss of power, and will cause the saw to run much more steadily than if only one set of gears was used.

Any number of wheels and sets of teeth may be used that may be desired; but for ordinary use two will be found sufficient. In some cases only one may be found sufficient.

In practice it is found that the rapid revolution of the mandrel tends to heat the bearings and interfere with the working of the machine. To prevent this a tube, $d$, is placed in the interior of the mandrel below the center, and runs back out of the rear end, and is bent sidewise, and is carried up through the table at one side, as shown at $e$. Through this tube cold water is run and exits through two small openings, $g\ g'$, one over each bearing $b\ b'$, and flows off out of the rear of the mandrel. By this means the bearings are kept cool, and all danger from heating is avoided.

I claim—

A hollow cylindrical saw, C, attached to the hollow mandrel B, having the slots or gear-teeth $c\ c$ in the shell thereof, in combination with one or more gear-wheels, D D', arranged and operating substantially as hereinbefore set forth.

In testimony whereof I have hereunto set my hand in the presence of two subscribing witnesses.

WILLIAM H. NUDD.

Witnesses:
C. N. WOODWARD,
JOHN T. HALSTED.